Nov. 4, 1924.

H. S. JANDUS

BUMPER CLAMPING DEVICE

Filed Jan. 28, 1924

1,513,817

Inventor
Herbert S. Jandus
By
Attys.

Patented Nov. 4, 1924.

1,513,817

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

BUMPER-CLAMPING DEVICE.

Application filed January 26, 1924. Serial No. 689,003.

*To all whom it may concern:*

Be it known that I, HERBERT S. JANDUS, a citizen of the United States, residing at Detroit, in the county of Wayne and State of Michigan, have invented a certain new and useful Improvement in Bumper-Clamping Devices, of which the following is a full, clear, and exact description, reference being had to the accompanying drawings.

This invention relates to bumpers for automobiles or similar vehicles, and more particularly to the means for clamping together the intermediate portions of a rear or auxiliary bar and a pair of front or impact bars. It is the general purpose and object of the invention to provide a means for clamping together the foregoing parts of a bumper in a particularly efficient manner.

A further and more limited object of the invention is to provide, for bumpers of the character specified, a clamp which is extremely simple in construction and economical of production, but which will, nevertheless, perform in a most efficient manner the functions for which it is designed.

Further and more limited objects and advantages of the invention will appear hereinafter and will be realized in and through the combination of elements embodied in the claims.

Figure 1:
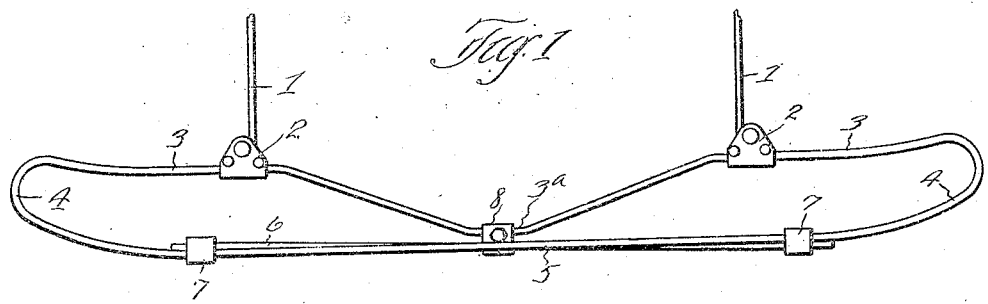
Figure 2:
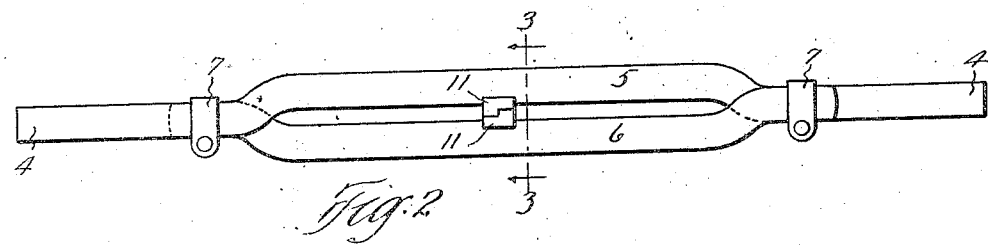
Figure 3:
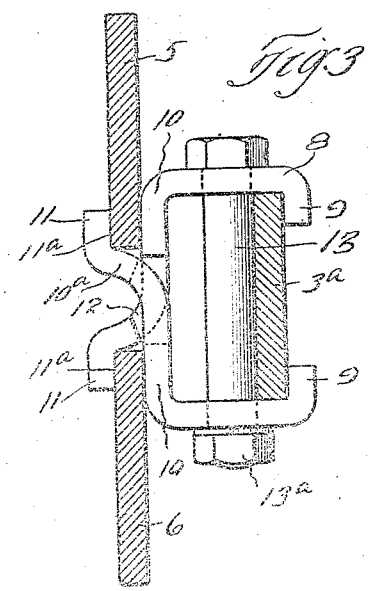

In the drawings, Fig. 1 represents a plan view of a bumper and its supporting arms, the bumper being equipped with my invention; Fig. 2, a front elevation of the bumper shown in Fig. 1; Fig. 3, a detail in section corresponding to the line 3—3 of Fig. 2; and Fig. 4, a detail in perspective of one of the symmetrical members of the clamping device.

Describing the various parts by reference characters, 1 denotes a pair of supporting arms adapted to be secured to the ends of the side members of an automobile or similar vehicle (not shown).

For convenience of description, the arms 1 will be assumed to be connected to the front ends of the side members of an automobile, and the terms "front" and "rear" will be used to define the relative positions of the parts of the bumper and clamping device, but without limiting my invention to any particular location of the same.

Secured to the front ends of the arms 1 are the clamping members 2, the said members each engaging the rear or auxiliary bar 3 of a bumper. As shown herein, this rear or auxiliary bar extends entirely across the back of the bumper and has its ends bent forwardly into U-shaped loops 4, the ends of the bars being spaced apart at the front of the bumper. The space between the ends of the bar 3 is bridged by a pair of oppositely offset bars 5 and 6, each bar having ends adapted to be secured to the ends of the bar 3, clamps 7 being employed for the purpose of securing these bars together. When thus assembled, the bars 5 and 6 are spaced apart, between their ends, while the central portion of the bar 3 is projected toward, but spaced a short distance rearwardly or laterally from, the central portions of the bars 5 and 6, as indicated at 3ª.

For the purpose of clamping the central portions of these bars in an efficient manner, I provide a clamping device consisting of a pair of identical stamped members, adapted to be applied to the top and bottom, respectively, of the part 3ª of the rear bar and to engage the front or impact bars 5 and 6, the clamping members being forced into an efficient clamping engagement with these bars by means of a connecting bolt.

Figure 4:
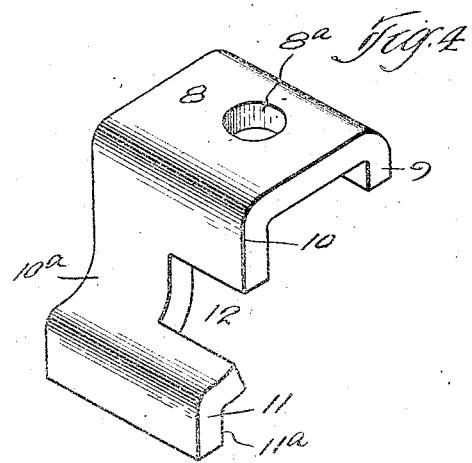

In Fig. 4, one of these clamping members is shown in perspective, and comprises a channeled upper end, such end comprising a horizontal body 8 having at one side thereof a short flange 9, projecting at right angles therefrom. From the opposite side of the body 8 there extends an elongated flange 10. This flange projects substantially at right angles from the body 8 to a point about midway of the width of the plate 3ª (when the clamping member is in use) whence it is offset forwardly, as indicated at 10ª, and is provided with a terminal lip or flange 11 which is parallel with the flange 9. The flanged part 10, 10ª of each clamp is provided with a notch 12 extending from one side edge of such member approximately half the width of such member, so that, when the two members are assembled in reversed positions, the total width of the clamping device will preferably be equal to the width of each member.

In practice, the body portion 8 will be of a width to enable each clamping member to be applied to the central portion 3ª of the rear bar, with the part 10 of each clamping member bearing against the rear or inner face of its corresponding bar 5 or 6. It will be noted, from Fig. 3, that, when the clamping members are assembled, the parts 10ª and 11 constitute legs which cross each other between the bars 5 and 6, the parts being so proportioned that the rear or inner face 11ª of each member 11 will engage the front face of the corresponding bar 5 or 6, pressing the rear face of such bar against the vertical part 10 of the other clamping member.

Each clamping member is provided with an aperture 8ª in the body portion 8 thereof, said apertures being located so that a bolt 13 passed therethrough will engage and bear against the outer face of the part 3ª of the rear or auxiliary bar while the opposite face of such bar is in engagement with the flanges 9.

With the parts constructed and arranged as described, by setting up the nut 13ª on the bolt 13, not only will the upper and lower members of the clamping device be drawn together in close engagement with the top and bottom edges of the rear or auxiliary bar, but will also exercise a combined wedging and clamping action on the lower and upper edges of the bars 5 and 6, respectively.

Furthermore, because of the inclination of the parts 10ª, setting up the nut 13ª will also cause the clamping members to exercise a spreading action against the bars 5 and 6.

Because of the construction and arrangement of the parts of my clamping device, the front and rear bars of the bumper will not only be secured together in a very efficient manner, but there will be no rattling of the bars or of the parts of the clamping device, owing to the interaction of the parts; and the clamping device is not only simple in construction but remarkably efficient in operation.

Having thus described my invention, what I claim is:

1. A clamping device for securing together a pair of vertically spaced bars and a bar spaced laterally from the first-mentioned bars, the said device comprising a pair of substantially identical clamping members each having a horizontal body and a flange adapted to engage the appropriate edge of the third bar and each having a portion adapted to engage the adjacent face of one of the first-mentioned bars and an offset extension adapted to engage the opposite face of the other of such first-mentioned bars, and means for securing the said members together.

2. A clamping device for securing together a pair of vertically spaced bars and a bar spaced laterally from the first mentioned bars, the said device comprising a pair of substantially identical clamping members each having a seat for one of the edges of the third bar, a portion spaced from such seat and adapted to engage the rear or inner face of the bar adjacent thereto, the said clamping members also having each a forwardly or outwardly extending end portion forming with such engaging portion of the opposite member a seat for the edge of one of the first mentioned bars, and means for drawing the said members together and into clamping engagement with the said bars.

3. A clamping device for securing together a pair of vertically spaced bars and a bar spaced laterally from the first mentioned bars, the said device comprising a pair of substantially identical clamping members each having a seat for one of the edges of the third bar, a horizontal body extending from such seat, a portion extending from such body and adapted to engage the rear or inner face of the bar adjacent thereto, the said clamping members having each a forwardly or outwardly extending end portion forming with such engaging portion of the opposite member a seat for the edge of one of the first mentioned bars, and a bolt extending through the horizontal body portions of said members for drawing the same together and into clamping engagement with the said bars.

4. A clamping device for securing together a pair of vertically spaced bars and a bar spaced laterally from the first-mentioned bars, the said device comprising a pair of substantially identical clamping members each having a horizontal body portion with a flange projecting from one edge thereof, a substantially vertical body portion and a forwardly offset end portion connected with the second body portion, the second body portion of each clamping member being slotted whereby the members may be assembled with their offset end portions crossing, and means for drawing the first-mentioned body portions of said members together.

5. A clamping device for securing together a pair of vertically spaced bars and a bar spaced laterally from the first-mentioned bars, the said clamping device comprising a pair of substantially identical members each having a seat adjacent one edge thereof for the third bar and a portion spaced forwardly from such seat and adapted to engage the inner or rear face of the adjacent front bar, each member having a forwardly offset end portion connected with the last-mentioned portion and each member being slotted intermediate the top and bottom thereof for substantially half its width, whereby the said members may be assembled with the offset portion of one member forming with the second body portion of the other member a seat for the edge of one of the front bars, and means connecting the said members between the seats thereof.

6. A clamping device for securing together a pair of vertically spaced bars and a bar spaced laterally from the first-mentioned bars, the said clamping device comprising a pair of substantially identical members each having a seat adjacent one edge thereof for the third bar and a portion spaced forwardly from such seat and adapted to engage the inner or rear face of the adjacent front bar, each member having a forwardly offset end portion connected with the last-mentioned portion and each member being slotted intermediate the top and bottom thereof for substantially half its width whereby the said members may be assembled with the offset portion of one member forming with the second body portion of the other member a seat for the edge of one of the front bars, and a bolt connecting the said members, said bolt extending through said members between the front and rear seats thereof.

7. A clamping device for securing together a pair of vertically spaced bars and a bar spaced laterally from the first-mentioned bars, said device comprising a pair of identical clamping members, each member having at its rear or inner side a seat for an edge of the third bar, a substantially vertical portion spaced forwardly from said seat and a forwardly offset end portion connected with such vertical portion, the said members being slotted for substantially half their width intermediate the vertical portion and the forwardly offset end portion thereof whereby they may be assembled with their end portions projecting in opposite directions, the end portion of each member forming with the vertical portion of the other member a seat for the cooperating edge of one of the first-mentioned bars, the front end portion of each member being so shaped as to exert with the vertical portion of the other member a wedging action upon the bar clamped therebetween, and means for drawing the said members together, the end portion of each member being so shaped that, when said members are drawn toward each other, a spreading action will be exerted upon the first two bars.

8. A clamping device for securing together a pair of vertically spaced bars and a bar spaced laterally from the first-mentioned bars, said device comprising a pair of identical clamping members, each member having at its rear or inner side a seat for an edge of the third bar, a substantially vertical portion spaced forwardly from said seat and a forwardly offset end portion connected with such vertical portion, the said members being slotted for substantially half their width intermediate the vertical portion and the forwardly offset end portion thereof whereby they may be assembled with their end portions projecting in opposite directions, the end portion of each member forming with the vertical portion of the other member a seat for the cooperating edge of one of the first-mentioned bars, and means for drawing the said members together, the end portion of each member being so shaped that, when said members are drawn toward each other, a spreading action will be exerted upon the first two bars.

9. The combination, with a pair of vertically spaced bumper bars and a bar spaced rearwardly or laterally therefrom, of a clamp comprising a pair of crossed members, the said members engaging opposite edges of the third bar between corresponding ends thereof and the proximate edges of the first two bars at the opposite ends thereof, and means for drawing the said members toward each other.

10. The combination, with a pair of vertically spaced bumper bars and a bar spaced rearwardly or laterally therefrom, of a clamp comprising a pair of crossed members, each having a seat at one end for an edge of the third bar, an intermediate portion adapted to engage the inner face of the first-mentioned bar which is adjacent thereto, and a portion adapted to engage the edge of the other of such first-mentioned bars, and means for drawing the said members toward each other.

11. The combination, with a pair of vertically spaced front or impact bars and a bar spaced rearwardly or laterally therefrom, of a clamp comprising a pair of crossed members each having a seat at one end for an edge of the third bar, and a portion adapted to engage the rear or inner face of the first-mentioned bar which is adjacent thereto, and an inclined portion adapted to engage the edge of the other of such first-mentioned bars, and means for drawing the said members toward each other.

In testimony whereof, I hereunto affix my signature.

HERBERT S. JANDUS.